United States Patent
Lin (10) Patent No.: US 11,199,874 B2
(45) Date of Patent: Dec. 14, 2021

(54) FOLDABLE TERMINAL

(71) Applicant: GUANGDONG OPPO MOBILE TELECOMMUNICATIONS CORP., LTD., Guangdong (CN)

(72) Inventor: Yugui Lin, Guangdong (CN)

(73) Assignee: SHENZHEN HEYTAP TECHNOLOGY CORP., LTD., Guangdong (CN)

( * ) Notice: Subject to any disclaimer, the term of this patent is extended or adjusted under 35 U.S.C. 154(b) by 50 days.

(21) Appl. No.: 16/879,936

(22) Filed: May 21, 2020

(65) Prior Publication Data
US 2020/0285274 A1    Sep. 10, 2020

Related U.S. Application Data

(63) Continuation of application No. 16/002,589, filed on Jun. 7, 2018, now Pat. No. 10,705,563, which is a
(Continued)

(30) Foreign Application Priority Data

Dec. 29, 2015    (CN) .......................... 201511026509.4

(51) Int. Cl.
*G06F 1/16*      (2006.01)
*H05K 5/00*      (2006.01)
(Continued)

(52) U.S. Cl.
CPC .............. *G06F 1/1616* (2013.01); *G06F 1/16* (2013.01); *G06F 1/1652* (2013.01); *G06F 1/1681* (2013.01); *H04M 1/02* (2013.01)

(58) Field of Classification Search
CPC ........ G06F 1/16; G06F 1/1652; G06F 1/1681; G06F 1/1616; G06F 1/1637;
(Continued)

(56) References Cited

U.S. PATENT DOCUMENTS 9,173,288 B1 * 10/2015 Kim ...................... G06F 1/1652
9,848,502 B1 * 12/2017 Chu .................... E05D 11/1078
(Continued)

FOREIGN PATENT DOCUMENTS

CN         1476213       2/2004
CN       103167068       6/2013
(Continued)

OTHER PUBLICATIONS

JPO, Office Action for JP Application No. 2018534627, dated Oct. 1, 2019.
(Continued)

*Primary Examiner* — Anthony M Haughton
(74) *Attorney, Agent, or Firm* — Hodgson Russ LLP (57) ABSTRACT

The present disclosure provides a foldable terminal, including a body and a flexible screen assembly. The body includes a first structural member, a second structural member and a coupling assembly. The coupling assembly includes a fixed member and two sliding bars. The two sliding bars are rotatably coupled to two side walls of the fixed member correspondingly and coupled to the first structural member and the second structural member correspondingly. The flexible screen assembly is disposed to a first side surface of the body, and has a bending area facing the fixed member.

20 Claims, 4 Drawing Sheets

Related U.S. Application Data continuation-in-part of application No. PCT/CN2016/113039, filed on Dec. 29, 2016.

(51) Int. Cl.
*H05K 7/00* (2006.01)
*H04M 1/02* (2006.01)

(58) Field of Classification Search
CPC .... G06F 1/1684; G06F 1/1633; G06F 1/1613; H04M 1/068; H04M 1/0216; H04M 1/0214; H04M 1/02; H04M 1/0206
See application file for complete search history.

(56) References Cited

U.S. PATENT DOCUMENTS

| | | | | |
|---|---|---|---|---|
| 2012/0044620 | A1* | 2/2012 | Song | G06F 1/1681 361/679.01 |
| 2014/0111954 | A1* | 4/2014 | Lee | G06F 1/1652 361/749 |
| 2015/0153787 | A1* | 6/2015 | Mok | G06F 1/1652 361/679.27 |
| 2015/0233162 | A1* | 8/2015 | Lee | G06F 1/1626 16/223 |
| 2015/0370287 | A1* | 12/2015 | Ko | G06F 1/1626 361/749 |
| 2015/0373863 | A1* | 12/2015 | Lin | A45C 11/00 206/774 |

FOREIGN PATENT DOCUMENTS

| | | |
|---|---|---|
| CN | 103576775 | 2/2014 |
| CN | 103578356 | 2/2014 |
| CN | 103620516 | 3/2014 |
| CN | 103778858 | 5/2014 |
| CN | 204069046 | 12/2014 |
| CN | 104282224 | 1/2015 |
| CN | 104506688 | 4/2015 |
| CN | 105491193 | 4/2016 |
| CN | 105549689 | 5/2016 |
| CN | 105549690 | 5/2016 |
| EP | 2421231 | 2/2012 |
| JP | 2009089377 | 4/2009 |
| KR | 20120016873 | 2/2012 |
| KR | 101505457 | 3/2015 |
| KR | 20150099677 | 9/2015 |
| WO | 2015126068 | 8/2015 |
| WO | 2016080239 | 5/2016 |

OTHER PUBLICATIONS

JPO, Office Action for JP Application No. 2018534627, dated Jun. 18, 2019.
KIPO, Office Action for KR Application No. 10-2018-7019935, dated Aug. 19, 2019.
SIPO, First Office Action for CN Application No. 201711068449, dated Apr. 28, 2019.
EPO, Office Action for EP Application No. 16881254.3, dated Nov. 13, 2018.
WIPO, ISR for PCT/CN2016/113039, dated Apr. 7, 2017.
SIPO, First Office Action for CN Application No. 201511026509, dated Jul. 26, 2017.
USPTO, Office Action for U.S. Appl. No. 16/002,589, dated Mar. 28, 2019.
IPI, Hearing Notice for IN Application No. 201837024807, Jul. 22, 2020.

* cited by examiner

FOLDABLE TERMINAL

CROSS-REFERENCE TO RELATED APPLICATIONS

This application is a continuation of U.S. patent application Ser. No. 16/002,589, filed Jun. 7, 2018, which is a continuation-in-part of International Application No. PCT/CN2016/113039, filed Dec. 29, 2016, which claims priority to Chinese Patent Application No. 201511026509.4, filed on Dec. 29, 2015. The entire disclosures of the aforementioned applications are incorporated herein by reference.

FIELD

The present disclosure relates to a field of electronic devices, and more particularly to a foldable terminal.

BACKGROUND

Compared with a traditional screen, a flexible screen has obvious advantages. The flexible screen is not only slim and light in volume, but also lower in power consumption than an original component, which is beneficial for improving a battery life of a device. Also, based on characteristics of the flexible, such as bendability and good flexibility, durability of the flexible screen is also greatly higher than that of the screen before, and the probability of accidental damage on the device is also reduced.

In the prior art, the flexible screen is applied to a terminal, so as to obtain a foldable terminal. When using an existing foldable terminal, the inventor discovers that there is a radius difference between an outer surface and an inner surface while the terminal is bent. The outer surface has a large length at a bending location, such that wrinkles tend to appear at the bending location of the terminal when the terminal is unfolded.

SUMMARY

Embodiments of the present disclosure provide a foldable terminal, including a body and a flexible screen assembly. The body includes a first structural member, a second structural member and a coupling assembly, an end portion of the first structural member defines a first sliding cavity and an end portion of the second structural member defines a second sliding cavity. The coupling assembly includes a fixed member and two sliding bars, first ends of the two sliding bars are rotatably coupled to two side walls of the fixed member correspondingly, and second ends of the two sliding bars are slidably coupled to the first sliding cavity and the second sliding cavity correspondingly. The flexible screen assembly is disposed to a first side surface of the body, and has a bending area facing the fixed member. The first side surface of the body includes at least side surfaces of the first structural member and the second structural member facing the flexible screen assembly. When the first structural member and the second structural member are folded toward each other, the fixed member slides toward a second side surface of the body opposite to the first side surface of the body under push of the bending area. The second side surface of the body includes at least side surfaces of the first structural member and the second structural member facing away from the flexible screen assembly. When the first structural member and the second structural member are spread relative to each other, the two opposite side walls of the fixed member get close to the end portions of the first structural member and the second structural member correspondingly, so as to flatten the second side surface of the body. The first sliding cavity has a first bottom wall opposite to an opening of the first sliding cavity, the second sliding cavity has a second bottom wall opposite to an opening of the second sliding cavity, the coupling assembly also includes two elastic members, one of the two elastic members is elastically coupled between the second end of one of the two sliding bars and the first bottom wall, and the other one of the two elastic members is elastically coupled between the second end of the other one of the two sliding bars and the second bottom wall.

Embodiments of the present disclosure further provide another foldable terminal, including: a body including two structural members and a coupling assembly coupled between the two structural members, the coupling assembly including a fixed member and two sliding bars, first ends of the two sliding bars being rotatably coupled to two opposite side walls of the fixed member correspondingly, second ends of the two sliding bars being slidably coupled to the two structural members correspondingly; and a flexible screen assembly disposed to a first side surface of the body, and having a bending area right opposite to the fixed member. The first side surface of the body includes at least side surfaces of the two structural members facing the flexible screen assembly. When the two structural members get close to each other to fold the body, the fixed member slides in a direction running away from the two structural members under push of the bending area. When the two structural members depart from each other to unfold the body, the fixed member gets close to the two structural members, so as to flatten a second side surface of the body. The second side surface of the body includes at least side surfaces of the two structural members facing away from the flexible screen assembly. The fixed member includes an upper-end surface and a lower-end surface opposite to each other, and in a direction from the upper-end surface to the lower-end surface, a length of the fixed member is equal to lengths of the two structural members. The two structural members each includes an inner-end surface and an outer-end surface, the inner-end surfaces of the two structural members face to each other and the outer-end surfaces of the two structural members face away from each other. The two structural members each define a sliding cavity extending in a direction from the inner-end surface to the outer-end surface, and the second end of the sliding bar is slidably connected in the sliding cavity. The inner-end surfaces of the two structural members each are provided with a baffle plate, and a surface of the baffle plate facing away from the flexible screen assembly is flush with the surface of the structural member facing away from the flexible screen assembly. When the two structural members are spread relative to each other, the two baffle plates abut against each other, and the fixed member is enclosed by the two baffle plates and the bending area.

Embodiments of the present disclosure further provide still another foldable terminal, including a body and a flexible screen assembly. The body includes a first structural member, a second structural member and a coupling assembly, an end portion of the first structural member defines a first sliding cavity and an end portion of the second structural member defines a second sliding cavity. The coupling assembly includes a fixed member and two sliding bars, first ends of the two sliding bars are rotatably coupled to two side walls of the fixed member correspondingly, and second ends of the two sliding bars are slidably coupled to the first sliding cavity and the second sliding cavity correspondingly. The flexible screen assembly is disposed to a first side surface of the body, and has a bending area facing the fixed member. The first side surface of the body includes at least side surfaces of the first structural member and the second structural member facing the flexible screen assembly. When the first structural member and the second structural member are folded toward each other, the fixed member slides toward a second side surface of the body opposite to the first side surface of the body under push of the bending area. The second side surface of the body includes at least side surfaces of the first structural member and the second structural member facing away from the flexible screen assembly. When the first structural member and the second structural member are spread relative to each other, the two opposite side walls of the fixed member get close to the end portions of the first structural member and the second structural member correspondingly, so as to flatten the second side surface of the body. The fixed member includes two side walls disposed opposite to each other, the side wall is provided with a groove, and the first end of the sliding bar is rotatably connected in the groove through a rotating shaft.

BRIEF DESCRIPTION OF THE DRAWINGS

In order to describe technical solutions of the present disclosure more clearly, accompanying drawings needed to be used in embodiments will be introduced briefly herein. Obviously, the drawings described below are just some embodiments of the present disclosure. For those skilled in the art, on the premise of not contributing creative labor, other drawings can be acquired according to these drawings.

DETAILED DESCRIPTION

Technical solutions in embodiments of the present disclosure will be described clearly and completely herein with reference to accompanying drawings in the embodiments of the present disclosure.

A foldable terminal involved in embodiments of the present disclosure can be any device having function of communication and storage, for example, an intelligent device with network function such as a tablet PC, a mobile phone, an electronic reader, a remote control, a personal computer (PC), a laptop, an on-board unit, a network television, a wearable device or the like.

In the description of the embodiments of the present disclosure, it should be understood that, terms such as "inwards rotation", "outwards rotation", "longitudinal", "lateral", "thickness", "upper" and "lower" should be construed to refer to orientations as then described or as illustrated in the drawings under discussion. These relative terms are for convenience of description and do not require that the present disclosure be constructed or operated in a particular orientation, thus should not be construed to limit the present disclosure.

First Embodiment

As illustrated in FIGS. 1-5, a foldable terminal 100 is provided by the present disclosure, includes a body 1 and a flexible screen assembly 2.

The body 1 includes a first structural member 11, a second structural member 12 and a coupling assembly 13. The first structural member 11 is coupled to the second structural member 12 through the coupling assembly 13. The flexible screen assembly 2 is disposed to a first side surface of the body 1, for example, a folding inner side surface 1a of the body 1 when the body 1 is in a folded state.

In some embodiments of the present disclosure, the body 1 may be configured as a housing for the foldable terminal 10.

The coupling assembly 13 includes a fixed member 131 and two sliding bars 132. First ends 1321 of the two sliding bars 132 are rotatably coupled to side walls 1313 of the fixed member 131 correspondingly, and second ends 1322 of the two sliding bars 132 are slidably coupled to the first structural member 11 and the second structural member 12 correspondingly, such that the fixed member 131 can have a slidable displacement with respect to the first structural member 11 and the second structural member 12. Furthermore, with the gradual unfolding of the body 1, the second ends 1322 of the two sliding bars 132 can gradually get close to bottoms of a first sliding cavity 111a and a second sliding cavity 121a correspondingly, so as to enable a length of a folding outer side surface 1b (i.e. a second side surface) of the body 1 to be reduced gradually, thereby allowing the folding outer side surface 1b of the body 1 to be flat and straight without wrinkles, after the foldable terminal 100 is unfolded. Moreover, a bending area 2a of the flexible screen assembly 2 is in contact with the fixed member 131, such that the bending area 2a of the flexible screen assembly 2 is supported by a flat part, thus improving press sensitivity in the bending area 2a of the flexible screen assembly 2.

In the present embodiment, the body 1 also includes a board, and the board is disposed in the first structural member 11 and the second structural member 12. In other embodiments, the board can also be only disposed in the first structural member 11, or be only disposed in the second structural member 12.

An external structure of the first structural member 11 is substantially same with an external structure of the second structural member 12. Electronic components disposed in the first structural member 11 can be same with or different from electronic components in the second structural member 12.

Figure 1:
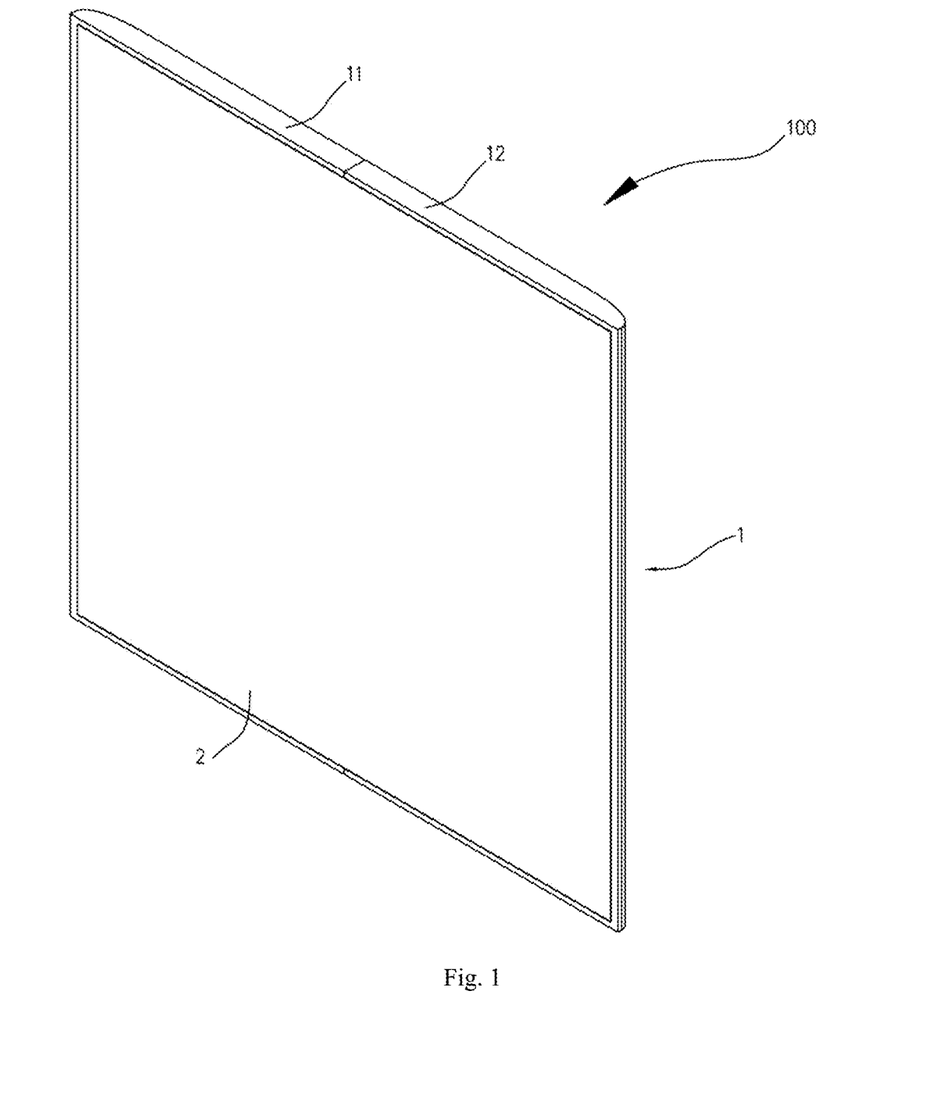
FIG. 1 is a schematic view of a foldable terminal provided by a first embodiment of the present disclosure.
Figure 2:
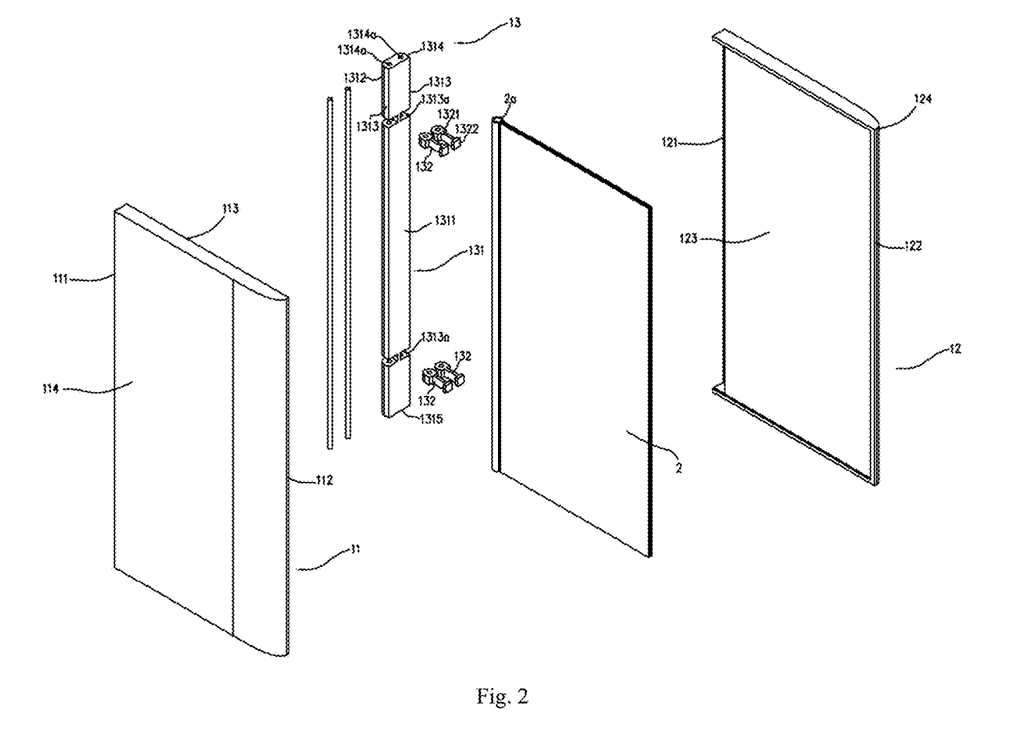
FIG. 2 is an exploded view of the foldable terminal illustrated in FIG. 1.
Figure 3:
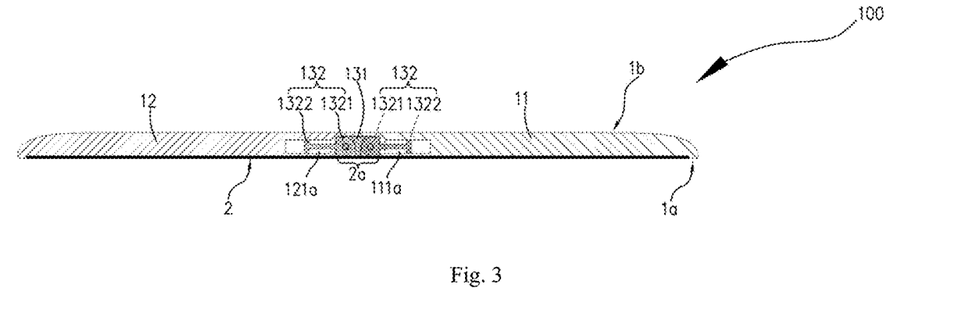
FIG. 3 is an internal schematic view of the foldable terminal illustrated in FIG. 2, in which the foldable terminal is in an unfolded state.

In the present embodiment, the first structural member 11 includes a first inner-end surface 111 and a first outer-end surface 112 disposed opposite to the first inner-end surface 111, as well as a side surface facing the flexible screen assembly 2 and another side surface facing away from the flexible screen assembly 2, such as a first inner surface 113 and a first outer surface 114 disposed opposite to the first inner surface 113, as illustrated when the body 1 is in the folded state. The first structural member 11 defines the first sliding cavity 111a therein, the first sliding cavity 111a extends in a direction from the first inner-end surface 111 to the first outer-end surface 112, and an opening of the first sliding cavity 111a is located in the first inner-end surface 111.

In the present embodiment, the second structural member 12 includes a second inner-end surface 121 and a second outer-end surface 122 disposed opposite to the second inner-end surface 121, as well as a side surface facing the flexible screen assembly 2 and another side surface facing away from the flexible screen assembly 2, such as a second inner surface 123 and a second outer surface 124 disposed opposite to the second inner surface 123, as illustrated when the body 1 is in the folded state. The second structural member 12 defines the second sliding cavity 121a therein, the second sliding cavity 121a extends in a direction from the second inner-end surface 121 to the second outer-end surface 122, and an opening of the second sliding cavity 121a is located in the second inner-end surface 121.

It could be understood that, the amount of the first sliding cavity 111a and the amount of the second sliding cavity 121a are corresponding to the amount of the sliding bars 132 of the coupling assembly 13.

In the present embodiment, the fixed member 131 has a long rectangle shape, so as to conveniently provide a flat support for the bending area 2a of the flexible screen assembly 2. The fixed member 131 includes a side surface facing the flexible screen assembly 2 and another side surface facing away from the flexible screen assembly 2, such as an inner side surface 1311 and an outer side surface 1312 disposed opposite to the inner side surface 1311, as illustrated when the body 1 is in the folded state, two side walls 1313 disposed opposite to each other, as well as an upper-end surface 1314 and a lower-end surface 1315 disposed opposite to the upper-end surface 1314. A direction from the upper-end surface 1314 to the lower-end surface 1315 is defined as a longitudinal direction. A longitudinal length of the fixed member 131 is same with a longitudinal length of the first inner-end surface 111, so as to ensure a flat support for press on any position in the bending area 2a of the flexible screen assembly 2.

In the present embodiment, the two sliding bars 132 are disposed symmetrically, thus further optimizing the structure of the coupling assembly 13.

In the present embodiment, the first ends 1321 of the two sliding bars 132 are rotatably coupled to the two side walls 1313 around the longitudinal direction of the fixed member 131 correspondingly, i.e. the first end 1321 of one sliding bar 132 is rotatably coupled to one of the two side walls 1313 around the longitudinal direction of the fixed member 131, while the first end 1321 of the other sliding bar 132 is rotatably coupled to the other one of the two side walls 1313 around the longitudinal direction of the fixed member 131, such that an open-close angle between the two sliding bars 132 can reach 180 degrees.

The second ends 1322 of the two sliding bars 132 are slidably coupled to the first structural member 11 and the second structural member 12 correspondingly, and located in the first sliding cavity 111a and the second sliding cavity 121a correspondingly. In other words, the second end 1322 of the one sliding bar 132 is slidably coupled to the first structural member 11 and located in the first sliding cavity 111a, while the second end 1322 of the other sliding bar 132 is slidably coupled to the second structural member 12 and located in the second sliding cavity 121a. The second end 1322 is a rectangular block, and a dimension of the second end 1322 is larger than dimensions of the openings of the first sliding cavity 111a and the second sliding cavity 121a, such that the two second ends 1322 just can be located in the first sliding cavity 111a and the second sliding cavity 121a correspondingly, and cannot be separated from the first sliding cavity 111a and the second sliding cavity 121a. In other embodiments, the second end 1322 can also have a spherical shape, an oval shape or a trapezoid shape, etc. In other embodiments, the two sliding bars 132 can also be asymmetrically disposed to the side walls 1313. For example, the two sliding bars 132 can be arranged one above the other.

In embodiments of the present disclosure, the first side surface of the body 1 includes at least side surfaces of the first structural member 11 and the second structural member 12 facing the flexible screen assembly 2, and the second side surface of the body 1 includes at least side surfaces of the first structural member 11 and the second structural member 12 facing away from the flexible screen assembly 2.

In some embodiments of the present disclosure, the first outer surface 114 of the first structural member 11, the outer side surface 1312 of the fixed member 131 and the second outer surface 124 of the second structural member 12 may constitute the folding outer side surface 1b of the body 1, and the first inner surface 113 of the first structural member 11 and the second inner surface 123 of the second structural member 12 may constitute the folding inner side surface 1a of the body 1, for example when an included angle between the first structural member 11 and the second structural member 12 is zero.

Figure 4:
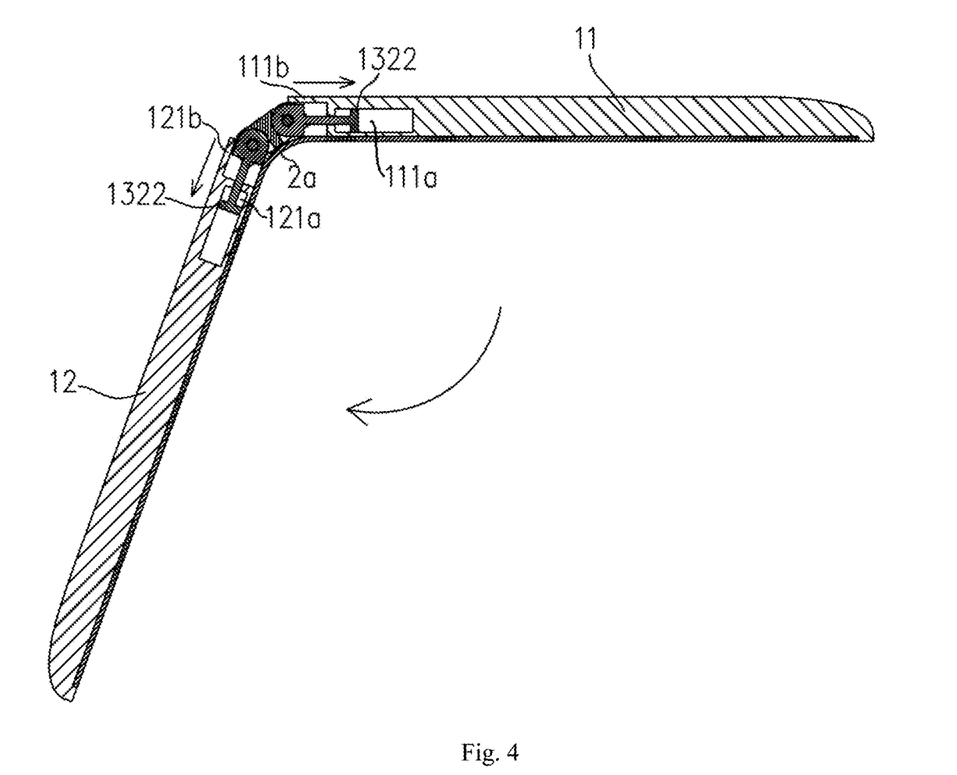
FIG. 4 is an internal schematic view of the foldable terminal illustrated in FIG. 2, in which the foldable terminal is in another bent state.
Figure 5:
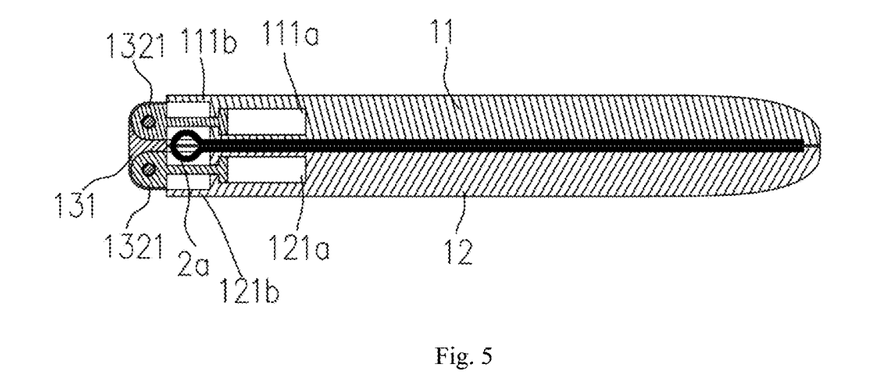
FIG. 5 is an internal schematic view of the foldable terminal illustrated in FIG. 2, in which the foldable terminal is in a further bent state.

In the present embodiment, the flexible screen assembly 2 is disposed on the folding inner side surface 1a of the body 1, a junction of the first structural member 11 and the second structural member 12 corresponds to the bending area 2a of the flexible screen assembly 2, and the bending area 2a of the flexible screen assembly 2 is in contact with the fixed member 131, such that with an folding angle of the body 1 gradually decreasing, a curvature of the bending area 2a of the flexible screen assembly 2 gradually increases. Thus, the bending area 2a gradually gets close to the inner side surface 1311 of the fixed member 131, until the bending area 2a is to be close fitted with the inner side surface 1311 of the fixed member 131. The fixed member 131 is then ejected in a direction running away from the bending area 2a of the flexible screen assembly 2, so as to increase the length of the folding outer side surface 1b of the body 1, such that the first structural member 11 can be close fitted with the second structural member 12, thus achieving the folding of the foldable terminal 100.

In the present embodiment, no matter the body 1 is in the unfolded state or the folded state, the flexible screen assembly 2 is always close fitted with the fixed member 131, i.e., a gap between the flexible screen assembly 2 and the inner side surface 1311 of the fixed member 131 is zero, such that when the body 1 is folded, the flexible screen assembly 2 can provide a larger force to eject the fixed member 131, thus further ensuring the folding of the foldable terminal 100. In other embodiments, when the body 1 is in the unfolded state, a gap can be provided between the flexible screen assembly 2 and the inner side surface 1311 of the fixed member 131, while when the body 1 is gradually folded, the flexible screen assembly 2 gets closer and closer to the inner side surface 1311 of the fixed member 131, until the flexible screen assembly 2 is in contact with the inner side surface 1311 of the fixed member 131.

In conclusion, when the foldable terminal 100 needs to be folded, the first structural member 11 and/or the second structural member 12 are gradually rotated inwards, so as to drive the sliding bar 132 to rotate relative to the fixed member 131, such that the folding angle of the body 1 gradually decreases, and the curvature of the bending area 2a of the flexible screen assembly 2 gradually increases. Thus, the bending area 2a is gradually close fitted with the inner side surface 1311 of the fixed member 131, so as to gradually increase the external force pushing the fixed member 131, such that the fixed member 131 is ejected in the direction running away from the bending area 2a of the flexible screen assembly 2, thus increasing the length of the folding outer side surface 1b of the body 1, and enabling the first structural member 11 to be close fitted with the second structural member 12, thereby achieving the folding of the foldable terminal 100. When the foldable terminal 100 needs to be unfolded, the first structural member 11 and/or the second structural member 12 are gradually rotated outwards, so as to drive the sliding bar 132 to rotate relative to the fixed member 131, such that the folding angle of the body 1 gradually increases. Thus, the second ends 1322 of the sliding bars 132 can gradually get close to the bottoms of the first sliding cavity 111a and the second sliding cavity 121a correspondingly, i.e. the second end 1322 of the one sliding bar 132 can gradually get close to the bottom of the first sliding cavity 111a and the second end 1322 of the other sliding bar 132 can gradually get close to the bottom of the second sliding cavity 121a, such that the length of the folding outer side surface 1b of the body 1 gradually decreases. When the unfolding of the foldable terminal 100 is achieved, the folding outer side surface 1b of the body 1 is a flat and straight surface without wrinkles.

For further improvements, the coupling assembly 13 has two sets of sliding bars 132, a pair of sliding bars 132 is configured as one set, and the first ends 1321 of the two sets of the sliding bars 132 are successively disposed to the fixed member 131 along the longitudinal direction of the fixed member 131.

The coupling assembly 13 is configured to include the two sets of sliding bars 132, thereby further ensuring smoothness when the body 1 is folded.

In the present embodiment, the first structural member 11 and the second structural member 12 each have two connection portions with the fixed member 131, and the first structural member 11 and the second structural member 12 each are rotatably coupled to the side wall 1313 through two sliding bars 132. Since one first structural member 11 is slidably coupled to the second ends 1322 of the two sliding bars 132, correspondingly, the first structural member 11 defines two first sliding cavities 111a therein, such that the second ends 1322 of the two sliding bars 132 coupled to the first structural member 11 can be located in the two first sliding cavities 111a correspondingly.

The second structural member 12 has the same construction. By configuring the coupling assembly 13 to include the two sets of sliding bars 132, it is possible to improve strength of connection between the first structural member 11 and the fixed member 131 and strength of connection between the second structural member 12 and the fixed member 131, thereby further ensuring the smoothness when the body 1 is folded.

For further improvements, the side wall 1313 defines a groove 1313a, and the first end 1321 of the sliding bar 132 is rotatably connected in the groove 1313a through a rotating shaft.

By rotatably connecting the first end 1321 of the sliding bar 132 in the groove 1313a through the rotating shaft, it is possible to further optimize the structure of the coupling assembly 13.

In the present embodiment, the fixed member 131 is provided with two first rotating holes 1314a, and two openings of the first rotating hole 1314a are located in the upper-end surface 1314 and the lower-end surface 1315 correspondingly. In other words, one of the two openings of the first rotating hole 1314a is located in the upper-end surface 1314, while the other one of the two openings of the first rotating hole 1314a is located in the lower-end surface 1315. The side wall 1313 is successively provided with two sets of symmetrical grooves 1313a in the longitudinal direction, one set of grooves 1313a includes two grooves 1313a, and the two grooves 1313a are located in the two side walls 1313 of the fixed member 131 correspondingly. In other words, one of the two grooves 1313a is located in one of the two side walls 1313 of the fixed member 131, while the other one of the two grooves 1313a is located in the other one of the two side walls 1313 of the fixed member 131. The first end 1321 of the sliding bar 132 is a cup head, so as to rotate in the groove 1313a smoothly. The first end 1321 of the sliding bar 132 is provided with a second rotating hole. When the first end 1321 of the sliding bar 132 is located in the groove 1313a, and the second rotating hole is aligned with the first rotating hole 1314a, and then the rotating shaft passes through the first rotating hole 1314a and the second rotating hole, such that the first end 1321 is rotatably coupled to the fixed member 131. In other embodiments, the sliding bar 132 can also be rotatably coupled to the fixed member 131 in following ways: the side wall 1313 defines a spherical groove, the first end 1321 of the sliding bar 132 is a ball head, and the first end 1321 of the sliding bar 132 is connected in the spherical groove in a ball joint manner.

For further improvements, the end portion of the first structural member 11 is provided with a first baffle plate 111b protruding therefrom and the end portion of the second structural member 12 is provided with a second baffle plate 121b protruding therefrom. An outer surface of the first baffle plate 111b is flush with the first outer surface 114 of the first structural member 11, and an outer surface of the second baffle plate 121b is flush with the second outer surface 124 of the second structural member 12. The coupling assembly 13 is configured to be enclosed by the first baffle plate 111b and the second baffle plate 121b.

By providing the first baffle plate 111b to the end portion of the first structural member 11 and providing the second baffle plate 121b to the end portion of the second structural member 12, it is possible to further improve the flatness of the folding outer side surface 1b of the body 1.

In the present embodiment, a sum of lengths of the first baffle plate 111b and the second baffle plate 121b along a transverse direction of the fixed member 131 is equal to a length of the outer side surface 1312 of the fixed member 131 along the transverse direction of the fixed member 131. When an included angle between the first structural member 11 and the second structural member 12 is 180 degrees, the folding outer side surface 1b of the body 1 is flush, and the fixed member 131 is located in a sealed cavity defined by the first baffle plate 111b, the second baffle plate 121b and the bending area 2a of the flexible screen assembly 2, so as to further improve the flatness of the folding outer side surface 1b of the body 1.

In the present embodiment, the first baffle plate 111b protrudes from the first inner-end surface 111, and forms a step together with the first inner-end surface 111. The second baffle plate 121b protrudes from the second inner-end surface 121, and forms a step together with the second inner-end surface 121. A direction of the first baffle plate 111b from the first inner-end surface 111 to the first outer-end surface 112 is defined as a width direction of the first baffle plate 111b, and the second baffle plate 121b is similar to the first baffle plate 111b. A direction of the fixed member 131 from one side wall 1313 to the other side wall 1313 is defined as a width direction of the fixed member 131. The width of the fixed member 131 is equal to the sum of widths of the first baffle plate 111b and the second baffle plate 121b. When the body is unfolded by 180 degrees, there is no gap in the folding outer side surface 1b of the body 1. In other embodiments, the sum of the lengths of the first baffle plate 111b and the second baffle plate 121b along the transverse direction of the fixed member 131 can also be less than the length of the outer side surface 1312 of the fixed member 131 along the transverse direction of the fixed member 131.

Second Embodiment

Figure 6:
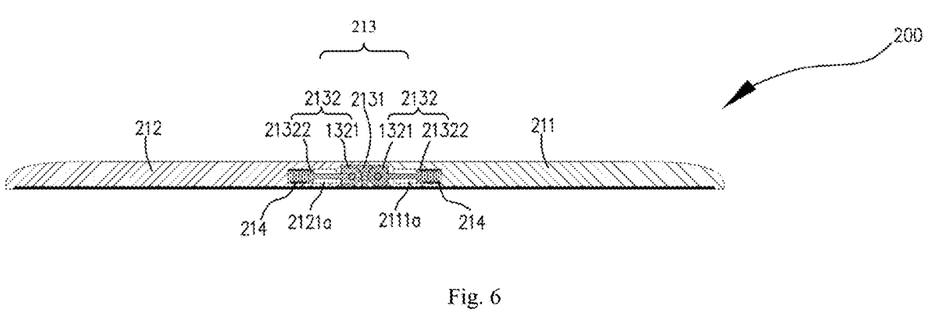
FIG. 6 is a schematic view of a foldable terminal provided by a second embodiment of the present disclosure.

As illustrated in FIG. 6, another foldable terminal 200 is provided according to embodiments of the present disclosure. The foldable terminal 200 according to embodiments of the present disclosure is generally same with the foldable terminal 100 provided in the first embodiment, but differs from the foldable terminal 100 in that a first sliding cavity 2111a has a first bottom wall opposite to an opening of the first sliding cavity 2111a, a second sliding cavity 2121a has a second bottom wall opposite to an opening of the second sliding cavity 2121a, and a coupling assembly 213 also includes two elastic members 214, in which one elastic member 214 is elastically coupled between a second end 21322 of a sliding bar 2132 and the first bottom wall, and the other elastic member 214 is elastically coupled between a second end 21322 of another sliding bar 2132 and the second bottom wall.

In the present embodiment, for providing a great deformation space, the elastic member 214 is a spring. Specifically, by elastically connecting the elastic member 214 between the second end 21322 of the sliding bar 2132 and the first bottom wall, and also elastically connecting the elastic member 214 between the second end 21322 of another sliding bar 2132 and the second bottom wall, it is possible to enable the first structural member 211 and the second structural member 212 to provide forces to eject the fixed member 2131, thereby further improving reliability in opening or closing the foldable terminal 200. In other embodiments, the elastic member 214 can also be silica gel.

When the foldable terminal 200 needs to be folded, until the included angle between the first structural member 211 and the second structural member 212 is zero, the first structural member 211 and the second structural member 212 are gradually rotated inwards respectively, so as to drive the sliding bars 2132 to rotate relative to the fixed member 2131, such that the folding angle of the body gradually decreases, and the curvature of the bending area of the flexible screen assembly gradually increases. The bending area is gradually close fitted with the inner side surface of the fixed member 2131, such that the fixed member 2131 is ejected in the direction running away from the bending area of the flexible screen assembly, thus increasing the length of the folding outer side surface of the body, and enabling the first structural member 211 to be close fitted with the second structural member 212, thereby achieving the folding of the foldable terminal 200.

When the foldable terminal 200 needs to be unfolded, until the included angle between the first structural member 211 and the second structural member 212 is 180 degrees, the first structural member 211 and the second structural member 212 are gradually rotated outwards respectively, so as to drive the sliding bars 2132 to rotate relative to the fixed member 2131, such that the folding angle of the body gradually increases. Thus, the second ends 21322 of the sliding bars 2132 can gradually get close to the bottoms of the first sliding cavity 2111a and the second sliding cavity 2121a correspondingly, such that the length of the folding outer side surface of the body gradually decreases. When the unfolding of the foldable terminal 200 is achieved, the folding outer side surface of the body 1 is flat and straight without wrinkles.

In the foldable terminal 200 provided by the present disclosure, the first end 1321 of the sliding bar 2132 is rotatably coupled to the side wall of the fixed member 2131, and the second ends 21322 of the two sliding bars 2132 are slidably coupled to the first structural member 211 and the second structural member 212 correspondingly, such that a slidable displacement can be provided between the fixed member 2131 with the first structural member 211 and between the fixed member 2131 with the second structural member 212. Furthermore, with the gradually unloading of the body, the second end 21322 of the sliding bar 2132 can gradually get close to the bottom of the sliding cavity 2111a or 2121a, so as to enable the length of the folding outer side surface of the body to be reduced gradually, thereby allowing the folding outer side surface of the body to be flat and straight without wrinkles, after the foldable terminal 200 is unfolded. Moreover, the bending area of the flexible screen assembly is in contact with the fixed member 2131, such that the bending area of the flexible screen assembly is supported by a flat part, thus improving press sensitivity in the bending area of the flexible screen assembly.

The above are example embodiments of the present disclosure, it should be noted that, for those skilled in the art, any improvement and modification without departing from principle of the present disclosure can be made, and also should be deemed as the protection scope of the present disclosure.

What is claimed is:

1. A foldable terminal, comprising a body and a flexible screen assembly,
the body comprising a first structural member, a second structural member and a coupling assembly, an end portion of the first structural member defining a first sliding cavity and an end portion of the second structural member defining a second sliding cavity;
the coupling assembly comprising a fixed member and two sliding bars, first ends of the two sliding bars being rotatably coupled to two opposite side walls of the fixed member correspondingly, second ends of the two sliding bars being slidably coupled to the first sliding cavity and the second sliding cavity correspondingly;
the flexible screen assembly being disposed to a first side surface of the body, the flexible screen assembly comprising a bending area facing the fixed member, the first side surface of the body comprising at least side surfaces of the first structural member and the second structural member facing the flexible screen assembly;
wherein when the first structural member and the second structural member are folded toward each other, the fixed member slides toward a second side surface of the body opposite to the first side surface of the body under push of the bending area, in which the second side surface of the body comprises at least side surfaces of the first structural member and the second structural member facing away from the flexible screen assembly; when the first structural member and the second structural member are spread relative to each other, the two opposite side walls of the fixed member get close to the end portions of the first structural member and the second structural member correspondingly, so as to flatten the second side surface of the body, wherein the first sliding cavity has a first bottom wall opposite to an opening of the first sliding cavity, the second sliding cavity has a second bottom wall opposite to an opening of the second sliding cavity, the coupling assembly also comprises two elastic members, one of the two elastic members is elastically coupled between the second end of one of the two sliding bars and the first bottom wall, and the other one of the two elastic members is elastically coupled between the second end of the other one of the two sliding bars and the second bottom wall.

2. The foldable terminal according to claim 1, wherein when the first structural member and the second structural member are spread relative to each other, a side surface of the fixed member facing the flexible screen assembly is in contact with the bending area, so as to support the bending area.

3. The foldable terminal according to claim 1, wherein the bending area is always close fitted with a side surface of the fixed member facing the flexible screen assembly.

4. The foldable terminal according to claim 1, wherein the elastic member is one of a spring and silica gel.

5. The foldable terminal according to claim 1, wherein the two sliding bars are symmetrically disposed.

6. The foldable terminal according to claim 1, wherein the coupling assembly comprises two sets of sliding bars, one pair of sliding bars is configured as one set, and the first ends of the two sets of sliding bars are disposed to the fixed member at intervals along a longitudinal direction of the fixed member.

7. The foldable terminal according to claim 1, wherein the fixed member comprises two side walls disposed opposite to each other, the side wall is provided with a groove, and the first end of the sliding bar is rotatably connected in the groove through a rotating shaft.

8. The foldable terminal according to claim 1, wherein the fixed member comprises two side walls disposed opposite to each other, the side wall is provided with a spherical groove, and the first end of the sliding bar is a ball head and is connected in the spherical groove in a ball joint manner.

9. The foldable terminal according to claim 1, wherein the end portion of the first structural member is provided with a first baffle plate, the end portion of the second structural member is provided with a second baffle plate, a surface of the first baffle plate facing away from the flexible screen assembly is flush with the side surface of the first structural member facing away from the flexible screen assembly, a surface of the second baffle plate facing away from the flexible screen assembly is flush with the side surface of the second structural member facing away from the flexible screen assembly, and the coupling assembly is configured to be enclosed by the first baffle plate and the second baffle plate.

10. The foldable terminal according to claim 9, wherein a sum of lengths of the first baffle plate and the second baffle plate along a transverse direction of the fixed member is equal to a length of another side surface of the fixed member facing away from the flexible screen assembly along the transverse direction of the fixed member,
when an included angle between the first structural member and the second structural member is 180 degrees, the second side surface of the body is flush, and the fixed member is located in a sealed cavity defined by the first baffle plate, the second baffle plate and the bending area of the flexible screen assembly.

11. The foldable terminal according to claim 1, wherein the body further comprises a board, and the board is disposed in at least one of the first structural member and the second structural member.

12. A foldable terminal, comprising:
a body comprising two structural members and a coupling assembly coupled between the two structural members, the coupling assembly comprising a fixed member and two sliding bars, first ends of the two sliding bars being rotatably coupled to two opposite side walls of the fixed member correspondingly, second ends of the two sliding bars being slidably coupled to the two structural members correspondingly; and
a flexible screen assembly disposed to a first side surface of the body, and having a bending area facing the fixed member, the first side surface of the body comprising at least side surfaces of the two structural members facing the flexible screen assembly;
wherein when the two structural members get close to each other to fold the body, the fixed member slides in a direction running away from the two structural members under push of the bending area; when the two structural members depart from each other to unfold the body, the fixed member gets close to the two structural members, so as to flatten a second side surface of the body opposite to the first side surface of the body, in which the second side surface of the body comprises at least side surfaces of the two structural members facing away from the flexible screen assembly,
wherein the fixed member comprises an upper-end surface and a lower-end surface opposite to each other, and in a direction from the upper-end surface to the lower-end surface, a length of the fixed member is equal to lengths of the two structural members,
wherein the two structural members each comprise an inner-end surface and an outer-end surface, the inner-end surfaces of the two structural members face to each other and the outer-end surfaces of the two structural members face away from each other,
the two structural members each define a sliding cavity extending in a direction from the inner-end surface to the outer-end surface, and the second end of the sliding bar is slidably connected in the sliding cavity,
wherein the inner-end surfaces of the two structural members each are provided with a baffle plate, and a surface of the baffle plate facing away from the flexible screen assembly is flush with the surface of the structural member facing away from the flexible screen assembly,
when the two structural members are spread relative to each other, the two baffle plates abut against each other, and the fixed member is enclosed by the two baffle plates and the bending area.

13. The foldable terminal according to claim 12, wherein the bending area is in contact with the fixed member, and the fixed member presents a long rectangle shape, so as to provide a flat support for the bending area.

14. The foldable terminal according to claim 12, wherein the coupling assembly has a plurality pairs of the sliding bars disposed symmetrically, and the plurality pairs of the sliding bars are coupled to the fixed member at intervals in the direction from the upper-end surface to the lower-end surface.

15. The foldable terminal according to claim 12, wherein in the direction from the inner-end surface to the outer-end surface, a sum of lengths of the two baffle plates is equal to a length of the fixed member.

16. A foldable terminal, comprising a body and a flexible screen assembly, the body comprising a first structural member, a second structural member and a coupling assembly, an end portion of the first structural member defining a first sliding cavity and an end portion of the second structural member defining a second sliding cavity;

the coupling assembly comprising a fixed member and two sliding bars, first ends of the two sliding bars being rotatably coupled to two opposite side walls of the fixed member correspondingly, second ends of the two sliding bars being slidably coupled to the first sliding cavity and the second sliding cavity correspondingly;

the flexible screen assembly being disposed to a first side surface of the body, the flexible screen assembly comprising a bending area facing the fixed member, the first side surface of the body comprising at least side surfaces of the first structural member and the second structural member facing the flexible screen assembly;

wherein when the first structural member and the second structural member are folded toward each other, the fixed member slides toward a second side surface of the body opposite to the first side surface of the body under push of the bending area, in which the second side surface of the body comprises at least side surfaces of the first structural member and the second structural member facing away from the flexible screen assembly; when the first structural member and the second structural member are spread relative to each other, the two opposite side walls of the fixed member get close to the end portions of the first structural member and the second structural member correspondingly, so as to flatten the second side surface of the body, wherein the fixed member comprises two side walls disposed opposite to each other, the side wall is provided with a groove, and the first end of the sliding bar is rotatably connected in the groove through a rotating shaft.

17. The foldable terminal according to claim 16, wherein when the first structural member and the second structural member are spread relative to each other, a side surface of the fixed member facing the flexible screen assembly is in contact with the bending area, so as to support the bending area.

18. The foldable terminal according to claim 16, wherein the bending area is always close fitted with a side surface of the fixed member facing the flexible screen assembly.

19. The foldable terminal according to claim 16, wherein the two sliding bars are symmetrically disposed.

20. The foldable terminal according to claim 16, wherein the coupling assembly comprises two sets of sliding bars, one pair of sliding bars is configured as one set, and the first ends of the two sets of sliding bars are disposed to the fixed member at intervals along a longitudinal direction of the fixed member.

* * * * *